June 10, 1969   J. W. SARGENT   3,449,607
COIL SUPPORT IN SALIENT POLE DYNAMOELECTRIC MACHINE
Filed Dec. 14, 1967
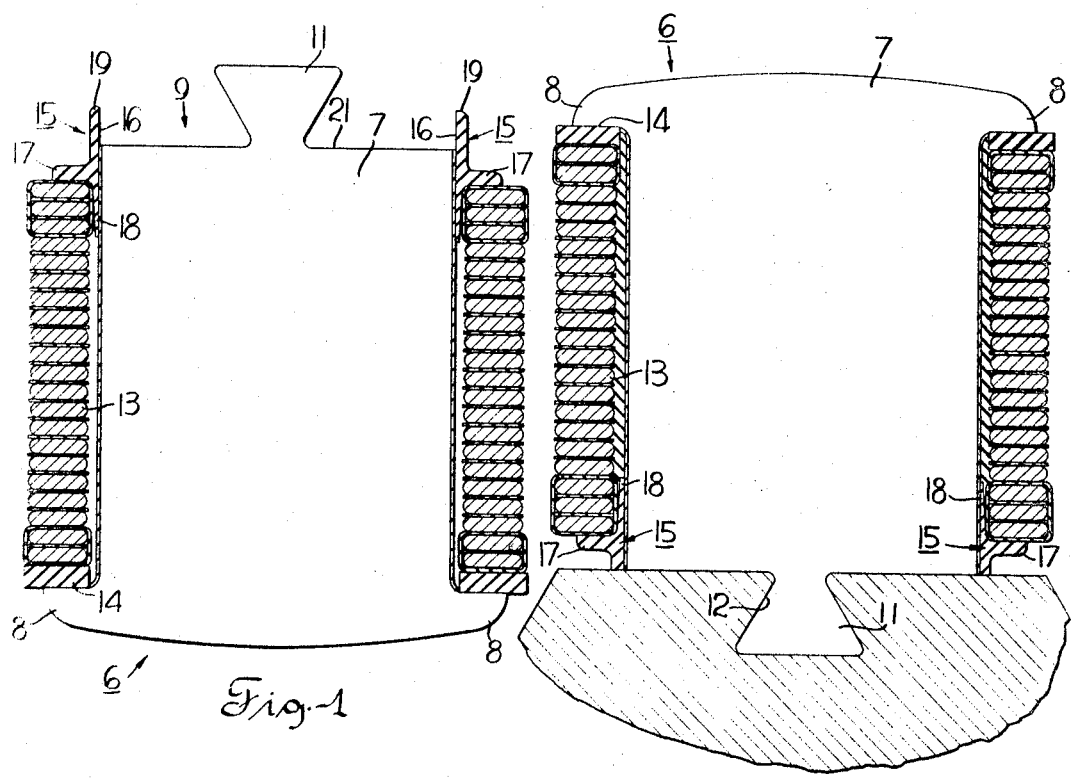
Fig. 1
Fig. 2
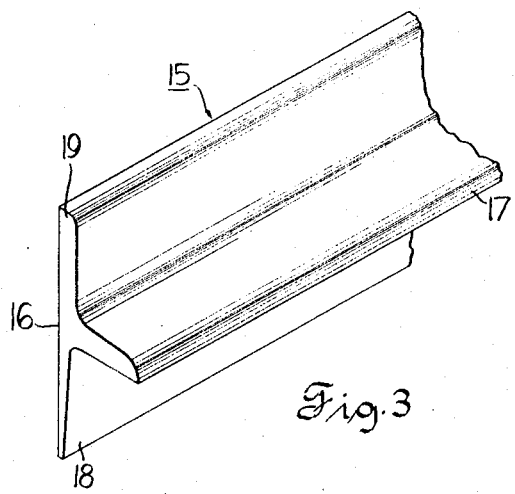
Fig. 3
Inventor
John W. Sargent
By John C Hines
Attorney

United States Patent Office 3,449,607
Patented June 10, 1969

3,449,607
COIL SUPPORT IN SALIENT POLE DYNAMOELECTRIC MACHINE
John W. Sargent, New Berlin, Wis., assignor to Allis-Chalmers Manufacturing Company, Milwaukee, Wis.
Filed Dec. 14, 1967, Ser. No. 690,668
Int. Cl. H02k 1/00, 3/00, 19/26
U.S. Cl. 310—194      2 Claims

ABSTRACT OF THE DISCLOSURE

A T-shaped support for form wound coils positione about a pole piece of a salient pole dynamoelectric machine. One part of the cross of the T is tapered and is located between the pole and the coil. The leg of the T overlies the coil end. The other part of the cross of the T projects beyond the pole surface with the excess trimmed off after the assembly is dipped in varnish and baked.

---

This invention pertains in general to dynamoelectric machines and more particularly to a means for supporting the windings placed about the pole pieces of dynamoelectric machines.

In dynamoelectric machines having salient poles, it is necessary to support the windings about the poles so they do not move under the influence of centrifugal force or under the influence of gravity due to different coefficients of expansion and contraction between the windings and the pole piece. Many devices have been developed directed specifically at this supporting problem. Current Patent Office classification 310–194 has quite a few patents directed to the solution of this problem.

The usual type of salient pole is T-shaped and has a dovetail extension at the base end of the T. This dovetail or connected end is for connection to either the machine rotor or frame. The coils are prewound to the desired shape and then slipped over the salient pole to rest on the lateral projections of the head portion of the T. The necessary insulation is applied and some form of support is provided to hold the coil at the base or connected end of the pole.

One means of supporting the coil at the connected end is to provide a base support between the end of the coil and the dynamoelectric machine. The coil is then held between the projections at the head of the T-shaped pole and the support. One of the difficulties of such an arrangement is that the coil length does vary so that supports of different thickness are necessary. This requires a supply of supports of many different thicknesses. Furthermore, time is required to select the proper support. It is applicant's intention and the general object of this invention to provide a support for a coil of a salient pole of a dynamoelectric machine which will fit a number of different coil lengths.

A more specific object of the subject invention is to provide a support of the hereinbefore described type wherein one leg of the support extends beyond the connected end of the pole so that it can be cut off flush with the surface of the connected end of the pole that contacts the dynamoelectric machine.

A further object of the subject invention is to provide a support for a salient pole coil of the hereinbefore described type wherein one leg of the support is tapered and wedged between the pole piece and the coil and there is a flange extending laterally therefrom engaging the end of the coil.

These and other objects of the subject invention will be more fully apparent as the following description is read in light of the attached drawing wherein:

FIG. 1 is a cross section of a salient pole having a coil thereon and showing the coil support prior to trimming;

FIG. 2 is a cross section similar to FIG. 1, showing the salient pole attached to a dynamoelectric machine after the coil support has been trimmed; and FIG. 3 is a partial isometric view showing an untrimmed coil support.

Referring to the patent drawing, a salient pole generally designated 6 may be constructed of a plurality of laminations 7. As shown, the lamination and resultant pole piece is T-shaped. The head end of the pole presents a pair of longitudinally extending lateral projections 8 on either side thereof. The base or connected end 9 of the pole piece 6 is provided with means for attachment to the dynamoelectric machine. In this particular embodiment each lamination 7 has a dovetail 11 formed on the connected end thereof. As shown in FIG. 2, a complementary dovetail slot 12 is machined in the surface of the machine to which the pole is to be connected.

In the usual case, a coil 13 is form wound on a winding form (not shown) and then positioned on the pole piece. A washer or spacer 14 may be inserted between the pole projections 8 and the head end of the coil 13. The coil is usually placed about the pole piece in the inverted position as shown in FIG. 1. According to this invention, after the coil has been positioned on the pole piece a base support 15 is applied in the manner shown in FIG. 1.

The support 15 is composed of a main portion having a substantially flat side 16 and a flange 17 extending laterally from the opposite side and intermediate the ends thereof. One end 18 of the support is tapered as best shown in FIG. 3. The other end 19 extends beyond the flange 17 a sufficient distance to extend beyond the surface 21 of the connected end 9 of the pole piece as best shown in FIG. 1.

The tapered end 18 is inserted between the pole piece 6 and the inner surface of the coil 13 until the flange 17 contacts the base end of the coil 13. The whole pole piece is then (as is well known in the art) dipped into an insulating material such as varnish. After the windings are completely saturated with the varnish, the pole piece is heated until the varnish is cured. At this point the portion of the base support 15 extending beyond the connected end 9 of the pole piece is trimmed off flush with the connected end of the pole piece. Pole piece dovetail 11 is then inserted into the dovetail slot 12 in the dynamoelectric machine. In this way the trimmed end of the base support 15 is in contact with the surface of the dynamoelectric machine and thereby holds the coil 13 firmly in place.

The end 18 of the base support 15 is tapered so that it can be easily inserted behind the coil.

From the above description it can be seen that an extremely inexpenesive support has been provided for a salient pole winding. The support is designed so that it will accommodate variations in the axial length of the coil.

Although only one embodiment of the subject invention has been herein shown and described, other embodiments will be apparent to those skilled in the art after this description is read and it is intended that all such embodiments as come within a reasonable interpretation of the appended claims be covered.

The embodiments of the invention in which an exclusive property or privilege is claimed are defined as follows:

1. In combination with a dynamoelectric machine salient pole piece with one end having aligned oppositely extending lateral extensions and the other end adapted for connection to said machine and including a surface adapted for abutting engagement with a complementary surface of said machine, a coil placed in encircling relation about said pole piece with one end engaging said extensions and a coil support engaging the other end of said coil, said coil support in the unfinished condition having one end extending beyond said surface of said pole piece to insure sufficient length of said support to permit it to be cut off flush with said pole piece surface and engage said machine surface when said pole piece is attached to said machine.

2. The combination set forth in claim 1 wherein the portion of said coil support engaging the other end of said coil is a laterally extending flange intermediate the ends thereof and the other end of said coil support is tapered and positioned between said coil and said pole piece.

References Cited

UNITED STATES PATENTS

| | | | |
|---|---|---|---|
| 1,506,763 | 9/1924 | Mattman | 310—194 |
| 1,821,796 | 9/1931 | Glidden | 310—194 |
| 2,300,864 | 11/1942 | Baudry et al. | 310—194 |
| 2,714,173 | 7/1955 | Wieseman | 310—194 |

WARREN E. RAY, *Primary Examiner.*

U.S. Cl. X.R.

310—214